US012754824B2

(12) United States Patent
Qiu et al.

(10) Patent No.: US 12,754,824 B2
(45) Date of Patent: Oct. 6, 2026

(54) COMPONENT DEBUGGING METHOD, APPARATUS, AND DEVICE, AND STORAGE MEDIUM

(71) Applicant: BEIJING ZITIAO NETWORK TECHNOLOGY CO., LTD., Beijing (CN)

(72) Inventors: Hao Qiu, Beijing (CN); Yujie Li, Beijing (CN); Zhengyu Jiang, Beijing (CN); Jiayi Xiao, Beijing (CN); Jun Shen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 165 days.

(21) Appl. No.: 18/573,937

(22) PCT Filed: May 5, 2022

(86) PCT No.: PCT/CN2022/091022
§ 371 (c)(1),
(2) Date: Dec. 22, 2023

(87) PCT Pub. No.: WO2023/279827
PCT Pub. Date: Jan. 12, 2023

(65) Prior Publication Data

US 2024/0362149 A1 Oct. 31, 2024

(30) Foreign Application Priority Data

Jul. 8, 2021 (CN) ......................... 202110772731.8

(51) Int. Cl.
*G06F 9/44* (2018.01)
*G06F 3/0484* (2022.01)
(Continued)

(52) U.S. Cl.
CPC ........ *G06F 11/3644* (2013.01); *G06F 3/0484* (2013.01); *G06F 11/3698* (2025.01)

(58) Field of Classification Search
CPC .. G06F 3/0481; G06F 3/0484; G06F 11/3644; G06F 11/3698; G06F 11/362; G06F 9/451
See application file for complete search history.

(56) References Cited

U.S. PATENT DOCUMENTS 9,652,364 B1 5/2017 Kaila et al.
10,628,285 B1 * 4/2020 Kollu ...................... G06F 11/36
(Continued)

FOREIGN PATENT DOCUMENTS

CN 102254049 A 11/2011
CN 104809053 A 7/2015
(Continued)

OTHER PUBLICATIONS

Yehia Abd Alrahman, Programming the Interactions of Collective Adaptive Systems by Relying on Attribute-based Communication, 2017, pp. 1-36. chrome-extension://efaidnbmnnnibpcajpcglclefindmkaj/https://arxiv.org/pdf/1711.06092 (Year: 2017).*
(Continued)

*Primary Examiner* — Mongbao Nguyen
(74) *Attorney, Agent, or Firm* — Fish & Richardson P.C.

(57) ABSTRACT

In a method, a debugging page for a target component is displayed, the debugging page comprising a debugging panel and a form exhibition window, the debugging panel being used for displaying an attribute of a target component in a preset debugging mode, the preset debugging mode being used for indicating a debugging operation for the attribute, and the form exhibition window being used for exhibiting the form of the target component. In response to the debugging operation for a target attribute on the debugging page, a debugged attribute value of the target attribute
(Continued)

is obtained. The form of the target component is displayed in the form exhibition window on the basis of the debugged attribute value.

12 Claims, 5 Drawing Sheets

(51) Int. Cl.

| | |
|---|---|
| ***G06F 9/445*** | (2018.01) |
| ***G06F 9/45*** | (2006.01) |
| ***G06F 9/455*** | (2018.01) |
| ***G06F 11/362*** | (2025.01) |
| ***G06F 11/3698*** | (2025.01) |

(56) References Cited

U.S. PATENT DOCUMENTS

| | | | | |
|---|---|---|---|---|
| 11,288,170 | B1* | 3/2022 | Chen | G06F 11/3698 |
| 2015/0346982 | A1* | 12/2015 | Johnson | G06F 11/3698 715/763 |
| 2017/0153778 | A1* | 6/2017 | Yuan | G06F 21/56 |
| 2019/0227911 | A1* | 7/2019 | Raviv | G06F 8/41 |
| 2019/0369849 | A1* | 12/2019 | Gonzalez | G06T 1/20 |
| 2020/0394036 | A1 | 12/2020 | Morneau | |
| 2021/0357309 | A1* | 11/2021 | Blouvshtein | G06F 11/3644 |

FOREIGN PATENT DOCUMENTS

| | | | | | |
|---|---|---|---|---|---|
| CN | 105955888 | A | * | 9/2016 | G06F 11/3698 |
| CN | 107038112 | A | | 8/2017 | |
| CN | 110119352 | A | * | 8/2019 | G06F 11/362 |
| CN | 111240661 | A | | 6/2020 | |
| CN | 111400177 | A | * | 7/2020 | G06F 11/362 |
| CN | 107038112 | B | * | 9/2020 | G06F 11/3644 |
| CN | 111752818 | A | * | 10/2020 | G06F 11/362 |
| CN | 111857690 | A | | 10/2020 | |
| CN | 113032273 | A | * | 6/2021 | G06F 11/362 |
| CN | 113535165 | A | | 10/2021 | |

OTHER PUBLICATIONS

Calvin Deutschbein, Mining Securebehaviorofhardwaredesigns, 2021, pp. 1-121. https://arxiv.org/pdf/2108.09249 (Year: 2021).*

English Translation, Xu (CN 110119352 A1), 2019, pp. 1-13. (Year: 2019).*

English Translation, Tan (CN 105955888 A), 2016, pp. 1-14. (Year: 2016).*

English Translation, He (CN 107038112 B), 2020, pp. 1-16. (Year: 2020).*

Iuhc228, "Visualization Building Components", available online at URL:https://www.bilibili.com/video/BV1La4ylj7uk?spm_id_from=333.337.search-card.all.click&vd_source=3fd9cdd7b3b6ab86e7a1ad2d32fc1fbf>, Sep. 14, 2020, starting from 1'25" to 3'40", screen captures with English translation (10 pages).

Heludd IT Grid House, "Get Dreamweaver in One Class", bilibili, available online at: URL:https://www.bilibili.com/video/BV1np4y1v7ve?spm_id_from=333.337.search-card.all.click&vd_source=3fd9cdd7b3b6ab86e7a1ad2d32fc1fbf> Aug. 10, 2020, starting from 27'35" to 28'25", screen captures with English translation (10 pages).

International Search Report and Written Opinion, International Patent Application No. PCT/CN2022/091022, Jul. 15, 2022, with English translation (18 pages).

Office Action in Chinese Appln. No. 202110772731.8, mailed on Mar. 11, 2026, 18 pages (with machine translation).

* cited by examiner

COMPONENT DEBUGGING METHOD, APPARATUS, AND DEVICE, AND STORAGE MEDIUM

CROSS-REFERENCE OF RELATED APPLICATION

This application is a national stage of International Application No. PCT/CN2022/091022, filed on May 5, 2022, which claims the priority of a Chinese patent application No. 202110772731.8 filed in China Patent Office on Jul. 8, 2021, both of the aforementioned applications are hereby incorporated by reference in their entireties.

FIELD OF THE INVENTION

The present disclosure relates to the field of data processing, and in particular, relates to a component debugging method, apparatus, device, and storage medium.

BACKGROUND

Components in an application program refer to various types of controls displayed on an interactive interface of the application program, such as a button control, an input box control and so on. In a practical application, the same component often has multiple forms. For example, for a button control, there is at least a pressed form and a non-pressed form. Before developing an application based on components, developers need to know the form and capability of each component in advance, so as to apply each component accurately and efficiently in the process of application development, and improve the overall efficiency of application development.

At present, the way to exhibit the forms and capabilities of components for users is relatively simple, as shown in FIG. 1, still taking the button control as an example, various forms of the button control are listed and exhibited for users as shown in FIG. 1. However, there are only limited forms that can be exhibited for users by the way of exhibiting the forms and capabilities of components as mentioned above. Assuming that the user needs to set a certain length of characters on the button control, the above-mentioned exhibition way cannot exhibit the corresponding form of the button control for users.

DISCLOSURE OF THE INVENTION

In order to solve or at least partially solve the above technical problem, the present disclosure may provide a component debugging method, apparatus, device, and storage medium, which can fully exhibit various forms of a target component for a user, so that the user can fully understand the capability of the target component, and the efficiency of application development based on the target component can be further improved.

In a first aspect, the present disclosure may provide a component debugging method, which may include:

- exhibiting a debugging page for a target component, wherein the debugging page may include a debugging panel and a form exhibition window, the debugging panel is used for exhibiting an attribute of a target component in a preset debugging mode which is used for indicating a debugging operation for the attribute, and the form exhibition window is used for exhibiting the form of the target component;
- in response to the debugging operation for a target attribute on the debugging page, acquiring a debugged attribute value of the target attribute, and
- exhibiting the form of the target component in the form exhibition window based on the debugged attribute value.

In an embodiment of the present disclosure, the debugging panel may further exhibit an attribute value range corresponding to the attribute of the target component.

In an embodiment of the present disclosure, before the exhibiting a debugging page for a target component, the method may further include:

- receiving a configuration file for the target component; wherein, the configuration file may include correspondence between attributes and attribute value types;
- based on an attribute value type corresponding to the attribute, determining a preset debugging mode corresponding to the attribute; wherein the preset debugging mode is used for indicating the debugging operation for the attribute.

In an embodiment of the present disclosure, the configuration file may include the correspondence among attributes, attribute value types and attribute value ranges, and the debugging panel is used to exhibit the attribute based on the preset debugging mode and attribute value range corresponding to the attribute.

In an embodiment of the present disclosure, the debugged attribute value is a limit value of the target attribute, and the exhibiting the form of the target component in the form exhibition window based on the debugged attribute value, may include:

- in the form exhibition window, exhibiting a form of the target component in a limit state corresponding to the target attribute based on the limit value.

In an embodiment of the present disclosure, the component debugging method is applied to a component test acceptance scenario.

In an embodiment of the present disclosure, the debugging panel is provided with a displacement control widget, and the method may further include:

- adjusting a display height of the debugging panel, in response to a preset trigger operation for the displacement control widget.

In an embodiment of the present disclosure, the target component may include an interactive component, and after the exhibiting the form of the target component in the form exhibition window based on the debugged attribute value, the method may further include:

- in response to a preset interactive operation triggered for the target component exhibited in the form exhibition window, exhibiting an interactive form of the target component in the form exhibition window.

In an embodiment of the present disclosure, the target component may include a preset type of component, which may include a page type of component and a to-be-triggered effect component;

- after in response to the debugging operation for a target attribute on the debugging page, acquiring a debugged attribute value of the target attribute, and before the exhibiting the form of the target component in the form exhibition window based on the debugged attribute value, the method may further include:
- exhibiting a preset control in the form exhibition window; wherein, the preset control is used for triggering exhibition of the form of the target component;

the exhibiting the form of the target component in the form exhibition window based on the debugged attribute value, may specifically include:

in response to a preset trigger operation for the preset control, exhibiting the form of the target component in the form exhibition window based on the debugged attribute value.

In a second aspect, the present disclosure provides a component debugging apparatus, which may include:

a first exhibition module configured to exhibit a debugging page for a target component, wherein the debugging page may include a debugging panel and a form exhibition window, the debugging panel is used for exhibiting an attribute of a target component in a preset debugging mode which is used for indicating a debugging operation for the attribute, and the form exhibition window is used for exhibiting the form of the target component;

an acquisition module configured to, in response to the debugging operation for a target attribute on the debugging page, acquire a debugged attribute value of the target attribute, and a second exhibition module configured to exhibit the form of the target component in the form exhibition window based on the debugged attribute value.

In a third aspect, the present disclosure provides a computer-readable storage medium storing instructions therein, the instructions, when running on a terminal device, cause the terminal device to implement the method as described above.

In a fourth aspect, the present disclosure provides an electronic device, including a memory, a processor, and a computer program stored in the memory and executable on the processor, and the processor, when executing the computer program, implements the method as described above.

In a fifth aspect, the present disclosure provides a computer program product comprising computer programs/instructions which, when executed by a processor, implement the method as described above.

In a sixth aspect, the present disclosure provides a computer program, program codes included in the computer program, when executed by a computer, cause the computer to implement the method as described above.

DESCRIPTION OF THE DRAWINGS

The accompanying drawings, which are incorporated in and constitute a part of this specification, illustrate embodiments consistent with the present disclosure and together with the description, serve to explain the principles of the present disclosure.

In order to explain a technical scheme in an embodiment of the present disclosure or in the prior art more clearly, the drawings needed in the description of the embodiment or the prior art will be briefly introduced below. Obviously, for those ordinary skilled in the field, other drawings can be obtained according to these drawings without requiring any creative work.

DETAILED DESCRIPTION OF PREFERRED EMBODIMENTS

Figure 1:
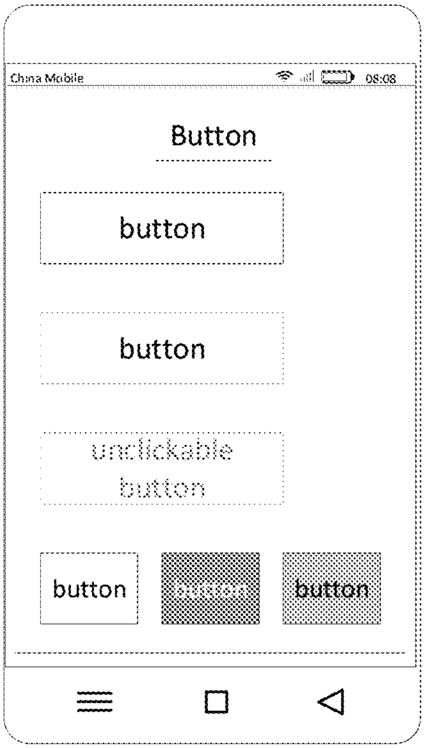
FIG. 1 is a schematic diagram of a component form exhibition page in the prior art.

In order to understand the above objects, features and advantages of the present disclosure more clearly, the scheme of the present disclosure will be further described below. It should be noted that the embodiments of the present disclosure and the features in the embodiments can be combined with each other without conflict.

In the following description, many specific details are set forth in order to fully understand the present disclosure, but the present disclosure may be practiced in other ways than those described herein; obviously, the embodiments in the specification are only part of the embodiments of the present disclosure, not all of them.

A component in an application program usually has various forms, and it is an urgent technical problem that how to fully and comprehensively exhibit various forms of the component for users so that the user can fully understand the capability of the target component.

Furthermore, how to fully and comprehensively exhibit various forms of components for users so as to improve the overall efficiency of component-based application development is an technical problem.

In an application scenario, before developing an application program based on components, developers need to know the capability of each component in advance, so as to implement application of each component accurately and efficiently in the process of application program development, and improve the overall development efficiency of application finally.

In another application scenario, after the component development is completed, it is often necessary to perform test acceptance for the component to determine whether the developed component meets expectations. Therefore, in the process of performing the test acceptance for the component, the premise for ensuring the result of test acceptance is to exhibit various forms of the component for users fully and comprehensively.

Based on the above-mentioned at least two application scenarios, how to fully and comprehensively exhibit various forms and capabilities of a component is a technical problem to be solved by an embodiment of this disclosure.

Therefore, the embodiment of the present disclosure provides a component debugging method, firstly, a debugging page for a target component is exhibited, wherein the debugging page may include a debugging panel and a form exhibition window, the debugging panel is used for exhibiting an attribute of a target component in a preset debugging mode which is used for indicating a debugging operation for the attribute, and the form exhibition window is used for exhibiting the form of the target component. Then, in response to the debugging operation for a target attribute on the debugging page, a debugged attribute value of the target attribute is acquired, and the form of the target component is exhibited in the form exhibition window based on the debugged attribute value.

The embodiment of the present disclosure can exhibit the form of the target component in the form exhibition window in real time based on a debugging operation for the attribute of the target component. Therefore, the embodiment of the present disclosure can fully and comprehensively exhibit various forms of the target component for a user, so that the user can fully understand the capability of the target component, and the efficiency of application development based on the target component can be further improved.

In addition, the embodiment of the present disclosure can exhibit the form of the target component in real time by a debugging operation for the attribute of the target component, to determine whether the target component meets the expectations based on the form of the target component when the test acceptance is performed for the target component, so as to complete the test acceptance of the target component.

Figure 2:
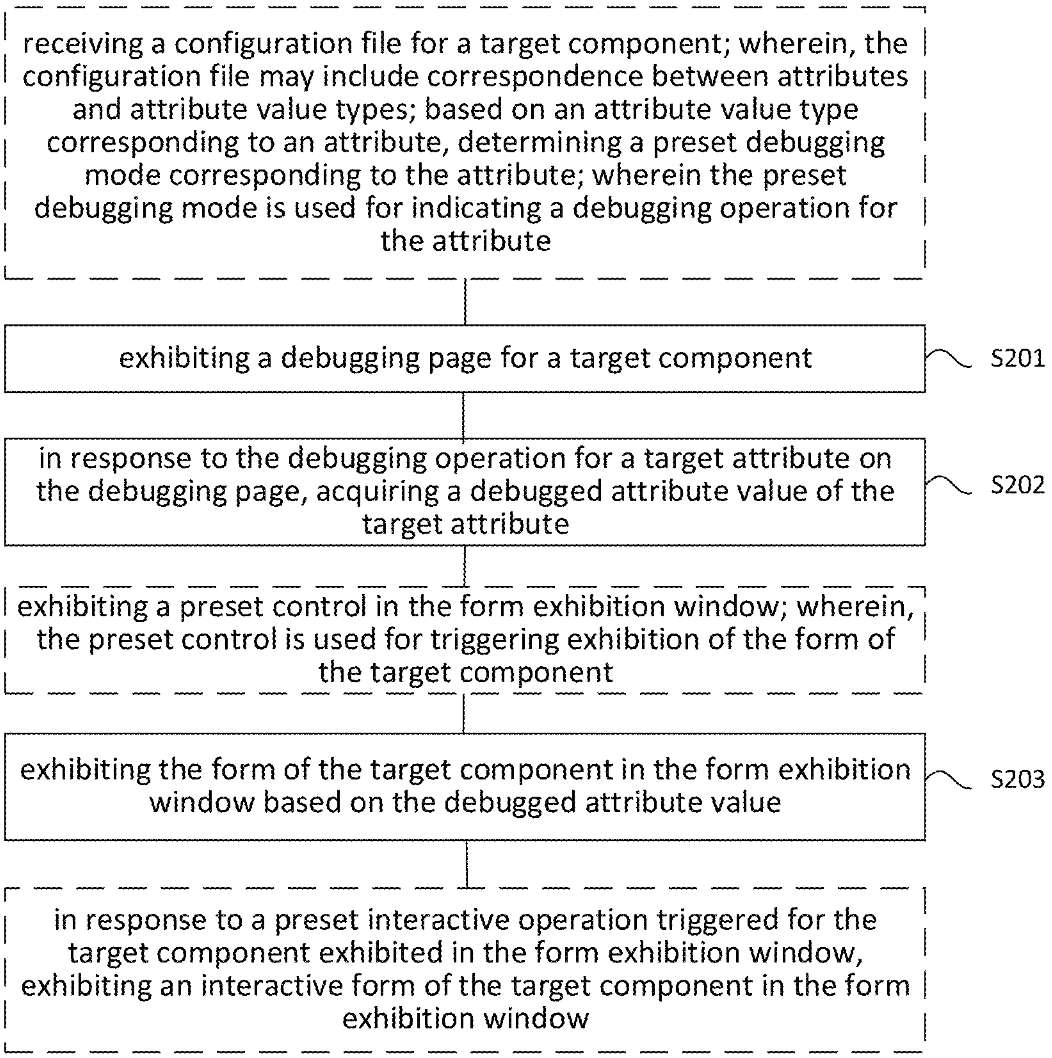
FIG. 2 is a flowchart of a component debugging method provided by an embodiment of the present disclosure.

On this basis, an embodiment of the present disclosure provides a component debugging method, referring to FIG. 2 which is a flowchart of a component debugging method provided by an embodiment of the present disclosure, and the method may include:

S201: exhibiting a debugging page for a target component.

Wherein the debugging page may include a debugging panel and a form exhibition window, the debugging panel is used for exhibiting an attribute of a target component in a preset debugging mode, the preset debugging mode is used for indicating a debugging operation for the attribute, and the form exhibition window is used for exhibiting the form of the target component.

In an embodiment of the present disclosure, a component may include various types of controls displayed on an interactive interface of the application program, such as a button control, an input box control and so on. Among them, a target component can be any type of control, such as a button control.

In an embodiment of the present disclosure, optionally, before the debugging page for the target component is exhibited, a configuration file for the target component may be received first, wherein the configuration file may include correspondence between attributes and attribute value types of the target component. Specifically, an attribute of the target component may be used to characterize a display feature of the target component, which may include, but not limited to, color, size, location information, etc. It should note that different components usually have different attributes.

In addition, an attribute value type may be used to characterize the type of an available attribute value of an attribute, for example, assuming that the available attribute value of an attribute is any value between 0 and 80, the attribute value type corresponding to the attribute is a continuous numerical type; assuming that the available attribute values of an attribute are "black", "red" and "green" respectively, the attribute value type corresponding to the attribute is enumerated numerical type, assuming that the available attribute values of the attribute are "open" and "close" respectively, the attribute value type corresponding to the attribute is Boolean numerical type. Embodiments of that present disclosure do not limit the types of attribute value.

After receiving the configuration file for the target component, an embodiment of the present disclosure can obtain the correspondence between the attributes and the attribute value types of the target component by analyzing the configuration file. Then, based on the attribute value type corresponding to the attribute, the preset debugging mode corresponding to the attribute can be determined. Wherein, the preset debugging mode is used for indicating the debugging operation for the attribute.

It should note that the above step is not necessary. In particular, the above step can be included in the method according to embodiments of the present disclosure, and can also be performed outside the method according to embodiments of the present disclosure. Even if the above step is not performed, the scheme of the present disclosure is still complete and can achieve advantageous technical effects, so it is shown by dotted lines in FIG. 2.

In an embodiment of the present disclosure, after the preset debugging mode corresponding to the attribute of the target component is determined, a debugging tool corresponding to the preset debugging mode is determined. Among them, the debugging tool can include, but not limited to, a slider debugging tools, a click debugging tool, an input debugging tool, a switch debugging tool, etc. For example, the preset debugging mode for an attribute corresponding to the above continuous numerical type can be implemented based on the slider debugging tool.

In an embodiment of the present disclosure, based on an attribute value type corresponding to an attribute, the determined preset debugging mode corresponding to the attribute may include one or more modes. Assuming that the attribute value type corresponding to an attribute is a continuous numerical type, the preset debugging mode corresponding to the attribute can include a debugging mode based on the slider debugging tool and a debugging mode based on the input debugging tool, that is to say, the attribute valude of a continuous numerical type of attribute can be debugged by the slider debugging, or the attribute value of a continuous numerical type of attribute can be debugged by the input debugging.

Figure 3:
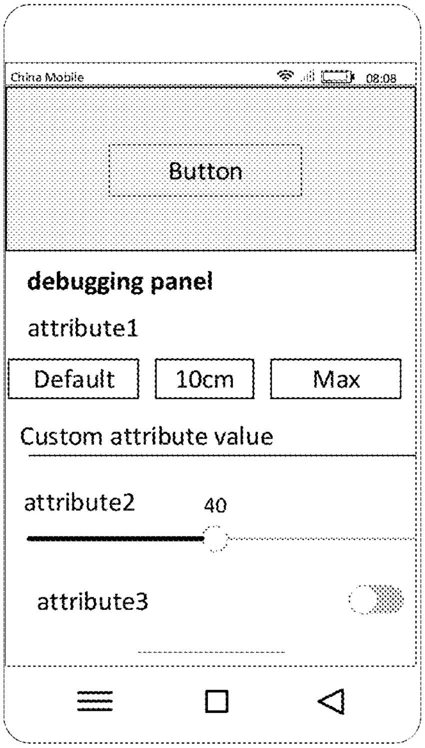
FIG. 3 is a schematic diagram of a debugging page for a target component provided by an embodiment of the present disclosure.

In an embodiment of the present disclosure, after a preset debugging mode corresponding to an attribute of a target component is determined, the corresponding attribute is exhibited on a debugging panel of a debugging page for the target component in the preset debugging mode. Referring to FIG. 3 which is a schematic diagram of a debugging page for a target component provided by an embodiment of the present disclosure, wherein the upper part of the debugging page is a form exhibition window 310, and the lower part is a debugging panel 320, and attributes of the target component are exhibited on the debugging panel 320 in a preset debugging mode. For example, attribute 2 of the target component is exhibited on the debugging panel in the manner of slider debugging.

In an embodiment of the present disclosure, the debugging panel 320 can also exhibit an attribute value range corresponding to an attribute of the target component for controlling the attribute value debugging range for the attribute. As shown in FIG. 3, the corresponding attribute value range corresponding to attribute 2 exhibited in the manner of slider debugging is 0-80.

In a practical application, the configuration file for the target component can include correspondence between the attribute, the attribute value type and the attribute value range. Specifically, the attribute is exhibited on the debugging panel 320 of the debugging page of the target component by displaying the preset debugging mode and the attribute value range corresponding to the attribute.

In addition, the debugging panel can also be provided with a displacement control widget, such as the displacement control widget 330 shown in FIG. 3, for adjusting the display height of the debugging panel. Specifically, after a preset trigger operation for the displacement control widget is received, the display height of the debugging panel can be adjusted.

In an embodiment of the present disclosure, the preset trigger operation for the displacement control widget may include a long press and drag operation for the displacement control widget, and the user can adjust the display height of the debugging panel by long pressing and dragging the displacement control widget up and down.

In a practical application, assuming the target component exhibited in the form exhibition window is large, the display height of the debugging panel can be adjusted by the displacement control widget to avoid the debugging panel covering the target component exhibited in the form exhibition window, thus avoiding the form exhibit effect of the target component being affected.

S202: in response to the debugging operation for a target attribute on the debugging page, acquiring a debugged attribute value of the target attribute, and exhibiting the form of the target component in the form exhibition window based on the debugged attribute value.

In an embodiment of the present disclosure, after the debugging page for the target component is exhibited, the user can trigger the debugging operation for a target attribute on the debugging page, wherein the target attribute can be any attribute exhibited on the debugging page. Specifically, after the debugging operation for the target attribute on the debugging page is received, a debugged attribute value of the target attribute is first acquired, for example, if the user debugs the attribute value corresponding to attribute 2 in FIG. 3 from 40 to 80, the debugged attribute value of attribute 2 is 80. Then, based on the debugged attribute value, the form of the target component is exhibited in the form exhibition window 310 on the debugging page.

Figure 4:
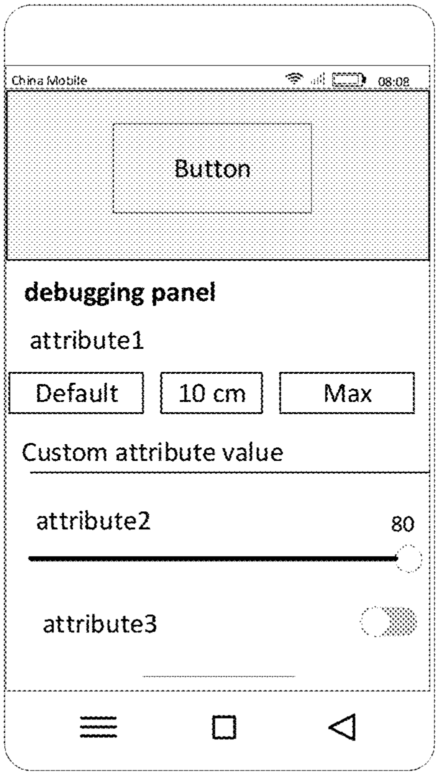
FIG. 4 is a schematic diagram of another debugging page for a target component provided by an embodiment of the present disclosure.

Referring to FIG. 4, which illustrates, after the attribute value corresponding to the attribute 2 in FIG. 3 is debugged from 40 to 80, the form of the target component exhibited in the form exhibition window 410 on the debugging page, specifically, taking the attribute 2 being the height as an example, it can be seen that the display effect of the height of the target component exhibited in the form exhibition window 410 in FIG. 4 is obviously greater than that of the target component in FIG. 3.

In an embodiment of the present disclosure, the target component may include an interactive component, such as a clickable button control, etc., after the form of the target component is exhibited in the form exhibition window, the user can trigger a preset interactive operation for the target component in the form exhibition window, For example, a click operation, a drag operation and so on are triggered for the button component.

In an embodiment of the present disclosure, optionally, when a preset interactive operation triggered for the target component exhibited in the form exhibition window is received, the interactive form of the target component is exhibited in the form exhibition window. For example, when a click operation triggered for a button component is received, the clicked form of the button component is exhibited in the form exhibition window. It should note that the above step is not necessary. In particular, the above step can be included in the method according to embodiments of the present disclosure, and can also be performed outside the method according to embodiments of the present disclosure. Even if the above step is not performed, the scheme of the present disclosure is still complete and can achieve advantageous technical effects, so it is shown by dotted lines in FIG. 2.

In an embodiment of the present disclosure, the interactive forms of various types of target components are exhibited by the form exhibition window, users can fully understand the capabilities of the target components, and the efficiency of application development based on the target components can be further improved.

In an embodiment of the present disclosure, the target component may also include a preset type of component, wherein the preset type of component may include a page type of component and a to-be-triggered effect component.

Specifically, a page type of component can include a page component with specific functions such as a page loading component, a video playback page component and so on, and can be directly called by different applications. However, because the exhibition of the page type of component needs to occupy the whole display page of the device, the preset control can serve as an entrance to trigger exhibition of the form of the component, so as to switch to the whole display page of the device for exhibiting the form of the page type of component. Among them, the preset control in the embodiment of the present disclosure can be any control with interactive function, for example, the preset control can be a button control, etc., the preset control is usually exhibited in the center of the form exhibition window, and it can also be exhibited at other positions in the form exhibition window as required. The embodiment of the present disclosure does not limit the exhibition position of the preset control.

In addition, the to-be-triggered effect component can include a component that requires active triggering by a user for exhibition, such as a pop-up type of component, toast message prompt box type of component, and so on. In order to reflect the characteristics of this class of components, the preset control can serve as an entrance to trigger exhibition of the forms of the class of components, and the preset control can be triggered for switching to exhibition of this class of components.

In addition, the to-be-triggered effect component can also include a component that needs to exhibit dynamic effects, such as a component that need to exhibit the staying time of the component or the page entry and exit effects. In order to dynamically exhibit the effects of such components, the preset control can serve as an entrance to trigger exhibition of the forms of such components, and the preset control can be triggered for switching to exhibition of such components.

In an embodiment of the present disclosure, assuming that the target component includes a preset type of component, after a debugging operation for a target attribute on the debugging page is received and a debugged attribute value of the target attribute is acquired, firstly, a preset control is exhibited in the form exhibition window; wherein, the preset control is used for triggering exhibition of the form of the target component. Then, when a preset trigger operation for the preset control is received, the form of the target component is exhibited in the form exhibition window based on the debugged attribute value. It should note that the above steps are not necessary. In particular, the above steps can be included in the method according to embodiments of the present disclosure, and can also be performed outside the method according to embodiments of the present disclosure. Even if the above steps are not performed, the scheme of the present disclosure is still complete and can achieve advantageous technical effects, so it is shown by dotted lines in FIG. 2.

In the component debugging method provided by embodiments of the present disclosure, firstly, a debugging page for a target component is exhibited, wherein the debugging page may include a debugging panel and a form exhibition window, the debugging panel is used for exhibiting an attribute of a target component in a preset debugging mode which is used for indicating a debugging operation for the attribute, and the form exhibition window is used for exhibiting the form of the target component. Then, in response to the debugging operation for a target attribute on the debugging page, a debugged attribute value of the target attribute is acquired, and the form of the target component is exhibited in the form exhibition window based on the debugged attribute value. The embodiment of the present disclosure can exhibit the form of the target component in the form exhibition window in real time based on a debugging operation for the attribute of the target component. Therefore, the embodiment of the present disclosure can fully and comprehensively exhibit various forms of the target component for a user, so that the user can fully understand the capability of the target component, and the efficiency of application development based on the target component can be further improved.

In a practical application, the form of a component in a limit state is a component form that application developers and component test and acceptance person pay close attention to. Therefore, an embodiment of the present disclosure can exhibit the user the form of a target component in a limit state corresponding to the target attribute in the form exhibition window, so that the user can fully understand various forms and capabilities of the target component.

In an embodiment of the present disclosure, when a debugging operation for a target attribute of a target component on the debugging page is received, a debugged attribute value of the target attribute is acquired. If it is determined that the debugged attribute value is the limit value of the target attribute, then in the form exhibition window, the form of a target component in a limit state corresponding to the target attribute is exhibited based on the limit value.

For example, taking the target attribute being the height as an example, after the attribute value of the height becomes the limit value of 80 by slider debugging, the form of the target component in the limit state that the height is the limit value of 80 is exhibited in the form exhibition window of the target component.

In the component debugging method provided by embodiments of the present disclosure, by exhibiting the form of the target component in the limit state corresponding to the target attribute, the user can fully understand various forms and capabilities of the target component.

Figure 5:
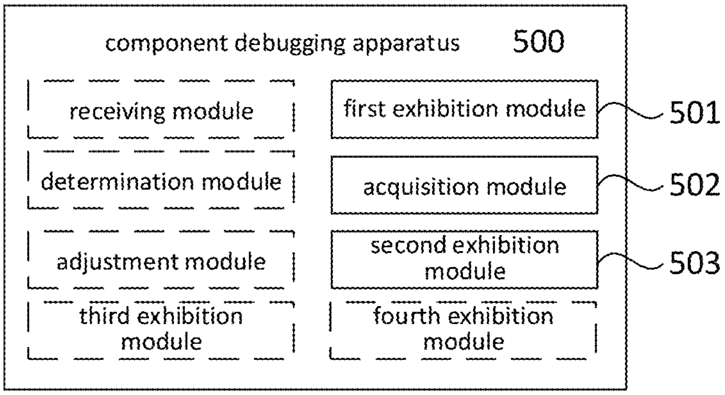
FIG. 5 is a schematic structural diagram of a component debugging apparatus provided by an embodiment of the present disclosure.

Based on embodiments of the above method, the present disclosure also provides a component debugging apparatus, referring to FIG. 5 which is a schematic structural diagram of a component debugging apparatus provided by an embodiment of the present disclosure, the apparatus includes:

a first exhibition module 501 configured to exhibit a debugging page for a target component, wherein the debugging page may include a debugging panel and a form exhibition window, the debugging panel is used for exhibiting an attribute of a target component in a preset debugging mode which is used for indicating a debugging operation for the attribute, and the form exhibition window is used for exhibiting the form of the target component;

an acquisition module 502 configured to, in response to the debugging operation for a target attribute on the debugging page, acquire a debugged attribute value of the target attribute, and a second exhibition module 503 configured to exhibit the form of the target component in the form exhibition window based on the debugged attribute value.

In an embodiment of the present disclosure, the debugging panel may further exhibit an attribute value range corresponding to the attribute of the target component.

In an embodiment of the present disclosure, the apparatus may further include:

a receiving module configured to receive a configuration file for the target component; wherein, the configuration file may include correspondence between attributes and attribute value types;

a determination module configured to, based on an attribute value type corresponding to the attribute, determine a preset debugging mode corresponding to the attribute; wherein the preset debugging mode is used for indicating the debugging operation for the attribute.

In an embodiment of the present disclosure, the configuration file may include the correspondence among attributes, attribute value types and attribute value ranges, and the debugging panel is used to exhibit the attribute based on the preset debugging mode and attribute value range corresponding to the attribute.

In an embodiment of the present disclosure, the debugged attribute value is a limit value of the target attribute, and the second exhibition module is specifically configured to:

in the form exhibition window, exhibit a form of the target component in a limit state corresponding to the target attribute based on the limit value.

In an embodiment of the present disclosure, the component debugging method is applied to a component test acceptance scenario.

In an embodiment of the present disclosure, the debugging panel is provided with a displacement control widget, and the apparatus may further include:

an adjustment module configured to adjust a display height of the debugging panel, in response to a preset trigger operation for the displacement control widget.

In an embodiment of the present disclosure, the target component may include an interactive component, and the apparatus may further include:

a third exhibition module configured to, in response to a preset interactive operation triggered for the target component exhibited in the form exhibition window, exhibit an interactive form of the target component in the form exhibition window.

In an embodiment of the present disclosure, the target component may include a preset type of component, which may include a page type of component and a to-be-triggered effect component;

The apparatus may further include:

a fourth exhibition module configured to exhibit a preset control in the form exhibition window; wherein, the preset control is used for triggering exhibition of the form of the target component;

the second exhibition module is specifically configured to:

in response to a preset trigger operation for the preset control, exhibit the form of the target component in the form exhibition window based on the debugged attribute value.

It should be pointed out that the above-mentioned receiving module, determination module, adjustment module, third exhibition module and fourth exhibition module are not necessarily included in the component debugging apparatus according to embodiments of the present disclosure, in particular, they may be included in the component debugging apparatus, or they may be located outside the component debugging apparatus to communicate with the component debugging apparatus, so they are shown by dotted lines in the drawings.

It should be noted that the above modules are only divided according to their specific functions, instead of being used to limit their specific implementations, for example, they can be implemented in software, hardware or a combination of software and hardware. In actual implementation, the above modules can be realized as independent physical entities, or can also be realized by a single entity (for example, a processor (CPU or DSP, etc.), an integrated circuit, etc.).

In addition, although not shown, the apparatus may also include a memory, which may store various information generated by the apparatus and various modules included in the apparatus during operation, programs and data used for operation, data to be transmitted by the communication unit, and the like. The memory may be a volatile memory and/or a nonvolatile memory. For example, the memory may include, but not limited to, random access memory (RAM), dynamic random access memory (DRAM), static random access memory (SRAM), read-only memory (ROM), and flash memory. Of course, the memory may also be located outside the apparatus. Alternatively, although not shown, the apparatus may also include a communication unit, which may be used to communicate with other apparatuses. In one example, the communication apparatus can be implemented in an appropriate manner known in the art, and will not be described in detail here.

In the component debugging apparatus provided by embodiments of the present disclosure, firstly, a debugging page for a target component is exhibited, wherein the debugging page may include a debugging panel and a form exhibition window, the debugging panel is used for exhibiting an attribute of a target component in a preset debugging mode which is used for indicating a debugging operation for the attribute, and the form exhibition window is used for exhibiting the form of the target component. Then, in response to the debugging operation for a target attribute on the debugging page, a debugged attribute value of the target attribute is acquired, and the form of the target component is exhibited in the form exhibition window based on the debugged attribute value. The embodiment of the present disclosure can exhibit the form of the target component in the form exhibition window in real time based on a debugging operation for the attribute of the target component. Therefore, the embodiment of the present disclosure can fully exhibit various forms of the target component for a user, so that the user can fully understand the capability of the target component, and the efficiency of application development based on the target component can be further improved.

In addition to the above method and apparatus, the embodiments of the present disclosure also provides a computer-readable storage medium in which instructions are stored, the instructions, when running on a terminal device, cause the terminal device to implement the component debugging method according to embodiments of the present disclosure.

The embodiments of the present disclosure also provides a computer program product, including computer programs/instructions, which, when executed by a processor, implement the component debugging method according to the embodiments of the present disclosure.

The embodiments of the present disclosure also provides a computer program, and the computer program includes program codes which, when executed by a computer, cause the computer to implement the component debugging method according to the embodiments of the present disclosure.

Figure 6:
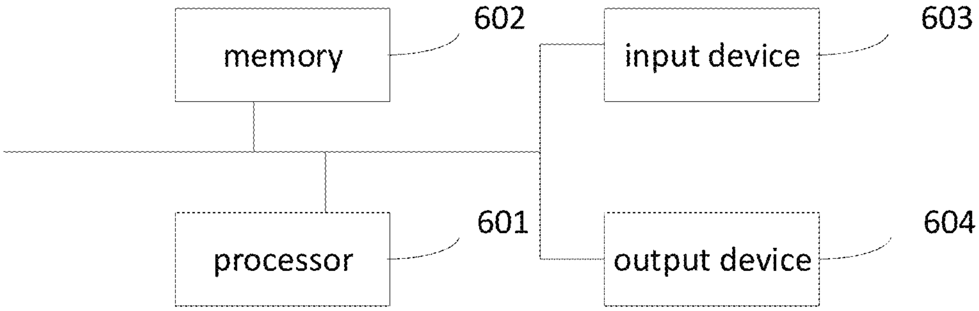
FIG. 6 is a schematic structural diagram of a component debugging device provided by an embodiment of the present disclosure.

In addition, an embodiment of the present disclosure also provides a component debugging device, as shown in FIG. 6, which may include:

a processor 601, a memory 602, an input device 603 and an output device 604. The number of processors 601 in the component debugging device can be one or more, and one processor is shown as an example in FIG. 6. In some embodiments of the present disclosure, the processor 601, the memory 602, the input device 603 and the output device 604 may be connected via a bus or other means, wherein the connection via a bus is shown as an example in FIG. 6.

The memory 602 can be used to store software programs and modules, and the processor 601 executes various functional applications and data processing of the component debugging device by running the software programs and modules stored in the memory 602. The memory 602 may mainly include a storage program area and a storage data area, wherein the storage program area may store an operating system, application programs required by at least one function, and the like. In addition, the memory 602 may include high-speed random access memory, and may also include non-volatile memory, such as at least one disk memory device, flash memory device, or other volatile solid-state memory devices. The input device 603 can be used to receive input digital or character information, and generate signal input related to user settings and function control for the component debugging device.

Specifically, in this embodiment, the processor 601 will load executable files corresponding to the processes of one or more application programs into the memory 602, and the processor 601 will run the application programs stored in the memory 602, so that various functions of the above-mentioned component debugging device can be implemented.

It should be noted that in this paper, relational terms such as "first" and "second" are only used to distinguish one entity or operation from another entity or operation, and do not necessarily require or imply that there exists any such actual relationship or order between these entities or operations. Moreover, the terms "include", "comprise" or any other variation thereof are intended to cover non-exclusive inclusion, so that a process, method, article or device including a series of elements includes not only those elements, but also other elements not explicitly listed, or elements inherent to such process, method, article or device. Without further restrictions, an element defined by the phrase "including one" does not exclude the existence of other identical elements in the process, method, article or device including the element.

What has been described above is only a specific embodiment of the present disclosure, so that those skilled in the art can understand or realize the present disclosure. Many modifications to these embodiments will be obvious to those skilled in the art, and the general principles defined herein can be implemented in other embodiments without departing from the spirit or scope of this disclosure. Therefore, the present disclosure will not be limited to the embodiments described herein, but can be accorded the widest scope consistent with the principles and novel features disclosed herein.

What is claimed is:

1. A component debugging method, wherein the component debugging method is appliable to a component development or test acceptance scenario for an application in a data processing field, and wherein the method comprises:

receiving a configuration file for a target component, wherein the configuration file comprises correspondence between attributes, attribute value types and attribute value ranges;

based on an attribute value type corresponding to an attribute, determining a present debugging mode corresponding to the attribute, wherein the preset debugging mode is used for indicating a debugging operation for the attribute;

exhibiting a debugging page for a target component by a display interface of an electronic device, wherein the debugging page comprises a debugging panel and a form exhibition window, the debugging panel is used for exhibiting an attribute of a target component based on a preset debugging mode and an attribute value range corresponding to the attribute, and the form exhibition window is used for exhibiting the form of the target component in real time based on the debugging operation for the attribute of the target component; and in response to the debugging operation for a target attribute on the debugging page, acquiring a debugged attribute value of the target attribute and exhibiting the form of the target component in the form exhibition window based on the debugged attribute value, wherein, the target component comprises an interactive component, and after the exhibiting the form of the target component in the form exhibition window based on the debugged attribute value, the method further comprises:

in response to a preset interactive operation triggered for the target component exhibited in the form exhibition window, exhibiting an interactive form of the target component in the form exhibition window.

2. The method of claim 1, wherein, the debugging panel further exhibits an attribute value range corresponding to the attribute of the target component.

3. The method of claim 1, wherein, the debugged attribute value is a limit value of the target attribute, and wherein, the exhibiting the form of the target component in the form exhibition window based on the debugged attribute value, comprises:

in the form exhibition window, exhibiting a form of the target component in a limit state corresponding to the target attribute based on the limit value.

4. The method of claim 1, wherein, the debugging panel is provided with a displacement control widget, and the method further comprises:

adjusting a display height of the debugging panel, in response to a preset trigger operation for the displacement control widget.

5. The method of claim 1, wherein, the target component comprises a preset type of component, which comprises a page type of component and a to-be-triggered effect component; and after in response to the debugging operation for a target attribute on the debugging page, acquiring a debugged attribute value of the target attribute, and before the exhibiting the form of the target component in the form exhibition window based on the debugged attribute value, the method further comprises:

exhibiting a preset control in the form exhibition window; wherein, the preset control is used for triggering exhibition of the form of the target component; and the exhibiting the form of the target component in the form exhibition window based on the debugged attribute value, specifically comprises:

in response to a preset trigger operation for the preset control, exhibiting the form of the target component in the form exhibition window based on the debugged attribute value.

6. A non-transitory computer-readable storage medium having stored instructions which, when executed on a terminal device, cause the terminal device to implement a component debugging method, wherein the component debugging method is appliable to a component development or test acceptance scenario for an application in a data processing field, and wherein the method comprises:

receiving a configuration file for a target component, wherein the configuration file comprises correspondence between attributes, attribute value types and attribute value ranges;

based on an attribute value type corresponding to an attribute, determining a preset debugging mode corresponding to the attribute, wherein the preset debugging mode is used for indicating a debugging operation for the attribute;

exhibiting a debugging page for a target component by a display interface of an electronic device, wherein the debugging page comprises a debugging panel and a form exhibition window, the debugging panel is used for exhibiting an attribute of a target component based on a preset debugging mode and an attribute value range corresponding to the attribute, and the form exhibition window is used for exhibiting the form of the target component in real time based on the debugging operation for the attribute of the target component; and in response to the debugging operation for a target attribute on the debugging page, acquiring a debugged attribute value of the target attribute and exhibiting the form of the target component in the form exhibition window based on the debugged attribute value, wherein, the target component comprises an interactive component, and the instructions. when executed on a terminal device, cause the terminal device to further implement, after the exhibiting the form of the target component in the form exhibition window based on the debugged attribute value:

in response to a preset interactive operation triggered for the target component exhibited in the form exhibition window, exhibiting an interactive form of the target component in the form exhibition window.

7. The non-transitory computer-readable storage medium of claim 6, wherein, the debugging panel is provided with a displacement control widget, and wherein the instructions, when executed on a terminal device, cause the terminal device to further implement:

adjusting a display height of the debugging panel, in response to a preset trigger operation for the displacement control widget.

8. The non-transitory computer-readable storage medium of claim 6, wherein, the target component comprises a preset type of component, which comprises a page type of component and a to-be-triggered effect component;

wherein instructions, when executed on a terminal device, cause the terminal device to further implements: after in response to the debugging operation for a target attribute on the debugging page, acquiring a debugged attribute value of the target attribute, and before the exhibiting the form of the target component in the form exhibition window based on the debugged attribute value:

exhibiting a preset control in the form exhibition window; wherein, the preset control is used for triggering exhibition of the form of the target component; and the exhibiting the form of the target component in the form exhibition window based on the debugged attribute value, specifically comprises:

in response to a preset trigger operation for the preset control, exhibiting the form of the target component in the form exhibition window based on the debugged attribute value.

9. An electronic device, wherein the electronic device is appliable to a component development or test acceptance scenario for an application in a data processing field, and wherein the electronic device comprises: a memory, a processor storing a computer program, and the processor, when executing the computer program, implements:

receiving a configuration file for a target component, wherein the configuration file comprises correspondence between attributes, attribute value types and attribute value ranges;

based on an attribute value type corresponding to an attribute, determining a preset debugging mode corresponding to the attribute, wherein the preset debugging mode is used for indicating a debugging operation for the attribute;

exhibiting a debugging page for a target component by a display interface of an electronic device, wherein the debugging page comprises a debugging panel and a form exhibition window, the debugging panel is used for exhibiting an attribute of a target component based on a preset debugging mode and an attribute value range corresponding to the attribute, and the form exhibition window is used for exhibiting the form of the target component in real time based on the debugging operation for the attribute of the target component; and in response to the debugging operation for a target attribute on the debugging page, acquiring a debugged attribute value of the target attribute and exhibiting the form of the target component in the form exhibition window based on the debugged attribute value, wherein, the target component comprises an interactive component, and the processor, when executing the computer program, further implements, after the exhibiting the form of the target component in the form exhibition window based on the debugged attribute value:

in response to a preset interactive operation triggered for the target component exhibited in the form exhibition window, exhibiting an interactive form of the target component in the form exhibition window.

10. The electronic device of claim 9, wherein, the debugged attribute value is a limit value of the target attribute, and wherein, the exhibiting the form of the target component in the form exhibition window based on the debugged attribute value, comprises:

in the form exhibition window, exhibiting a form of the target component in a limit state corresponding to the target attribute based on the limit value.

11. The electronic device of claim 9, wherein, the debugging panel is provided with a displacement control widget, and wherein the processor, when executing the computer program, further implements:

adjusting a display height of the debugging panel, in response to a preset trigger operation for the displacement control widget.

12. The electronic device of claim 9, wherein, the target component comprises a preset type of component, which comprises a page type of component and a to-be-triggered effect component;

wherein the processor, when executing the computer program, further implements: after in response to the debugging operation for a target attribute on the debugging page, acquiring a debugged attribute value of the target attribute, and before the exhibiting the form of the target component in the form exhibition window based on the debugged attribute value:

exhibiting a preset control in the form exhibition window; wherein, the preset control is used for triggering exhibition of the form of the target component; and the exhibiting the form of the target component in the form exhibition window based on the debugged attribute value, specifically comprises:

in response to a preset trigger operation for the preset control, exhibiting the form of the target component in the form exhibition window based on the debugged attribute value.

* * * * *